United States Patent
Annovi et al.

(10) Patent No.: US 10,480,939 B2
(45) Date of Patent: Nov. 19, 2019

(54) HIGH SPEED STEREOSCOPIC PAVEMENT SURFACE SCANNING SYSTEM AND METHOD

(71) Applicant: FUGRO ROADWARE INC., Mississauga (CA)

(72) Inventors: Andrea Annovi, Mississauga (CA); Ryan Fechney, Mississauga (CA); Shashibushan Yenkanchi, Mississauga (CA); David Lowe, Mississauga (CA); Hitesh Shah, Mississauga (CA); Prasanna Kumar Sivakumar, Austin, TX (US); Ishar Pratap Singh, Mississauga (CA); Miroslava Galchinsky, Mississauga (CA)

(73) Assignee: FUGRO ROADWARE INC., Mississauga, Ontario (CA)

( * ) Notice: Subject to any disclaimer, the term of this patent is extended or adjusted under 35 U.S.C. 154(b) by 0 days.

(21) Appl. No.: 16/257,384

(22) Filed: Jan. 25, 2019

(65) Prior Publication Data
US 2019/0154442 A1   May 23, 2019

Related U.S. Application Data

(63) Continuation-in-part of application No. 14/996,803, filed on Jan. 15, 2016, now Pat. No. 10,190,269.

(51) Int. Cl.
*G01C 7/04*     (2006.01)
*E01C 23/07*    (2006.01)
(Continued)

(52) U.S. Cl.
CPC ............. *G01C 7/04* (2013.01); *E01C 23/01* (2013.01); *E01C 23/07* (2013.01); *E01C 23/08* (2013.01);
(Continued)

(58) Field of Classification Search
None
See application file for complete search history.

(56) References Cited

U.S. PATENT DOCUMENTS

2011/0118967 A1* 5/2011 Tsuda .................... B60W 30/10
                                                    701/117
2013/0155061 A1* 6/2013 Jahanshahi ............. G06T 15/00
                                                    345/419
(Continued)

OTHER PUBLICATIONS

Weil "Automated pavement distress inspection based on 2D and 3D information" (Year: 2011).*

*Primary Examiner* — Eileen M Adams

(57) ABSTRACT

Disclosed is a mobile pavement surface scanning system for detecting pavement distress. In an embodiment the system comprises one or more light sources mounted on the mobile vehicle for illuminating a pavement, one or more stereoscopic image capturing devices mounted on the vehicle for capturing sequential images of an illuminated pavement surface, and a plurality of positioning sensors mounted on the mobile vehicle, the positioning sensors adapted to encode movement of the mobile vehicle and provide a synchronization signal for the sequential images captured by the one or more stereoscopic image capture devices. One or more computer processors are adapted to synchronize the intensity image pairs captured by each camera in the one or more stereoscopic image capturing devices, perform a 3D reconstruction of the pavement from the intensity image pairs using stereoscopic principles, generate a depth image and an intensity image pair from the 3D reconstruction, and process at least one of the depth image and the intensity image utilizing one or more distress detection modules to detect a type of pavement distress.

22 Claims, 9 Drawing Sheets

(51) Int. Cl.

| | | |
|---|---|---|
| *E01C 23/08* | (2006.01) | |
| *G01B 11/30* | (2006.01) | |
| *G06T 7/593* | (2017.01) | |
| *H04N 13/239* | (2018.01) | |
| *H04N 5/225* | (2006.01) | |
| *H04N 13/122* | (2018.01) | |
| *H04N 13/282* | (2018.01) | |
| *E01C 23/01* | (2006.01) | |
| *G01B 11/24* | (2006.01) | |
| *H04N 13/00* | (2018.01) | |
| *H04N 5/222* | (2006.01) | |

(52) U.S. Cl.
CPC ............ *G01B 11/24* (2013.01); *G01B 11/303* (2013.01); *G06T 7/593* (2017.01); *H04N 5/2256* (2013.01); *H04N 13/122* (2018.05); *H04N 13/239* (2018.05); *H04N 13/282* (2018.05); *G06T 2207/10021* (2013.01); *G06T 2207/20081* (2013.01); *G06T 2207/30252* (2013.01); *H04N 5/2226* (2013.01); *H04N 2013/0081* (2013.01)

(56) References Cited

U.S. PATENT DOCUMENTS

| | | | | |
|---|---|---|---|---|
| 2013/0176424 A1* | 7/2013 | Weil | ........................ | G01S 7/003 |
| | | | | 348/128 |
| 2014/0303853 A1* | 10/2014 | Itoh | ........................ | B60R 11/04 |
| | | | | 701/49 |
| 2015/0204687 A1* | 7/2015 | Yoon | .................. | G01C 21/3658 |
| | | | | 701/436 |
| 2016/0076934 A1* | 3/2016 | Low | .................. | G06K 9/00791 |
| | | | | 250/208.1 |

\* cited by examiner

HIGH SPEED STEREOSCOPIC PAVEMENT SURFACE SCANNING SYSTEM AND METHOD

CROSS-REFERENCE TO RELATED APPLICATIONS

This application is a continuation-in-part of U.S. patent application Ser. No. 14/996,803 filed on Jan. 15, 2016, which is hereby incorporated by reference in its entirety.

FIELD

This disclosure relates broadly to surface digitization systems and methods for accurate detection and assessment of pavement profiles and three dimensional (3D) surfaces for the purposes of detecting and measuring pavement distresses.

BACKGROUND

An accurate assessment and identification of road pavement surfaces is required for timely maintenance of roads (pavements). Pavements develop many different modes of distresses over time, including but not limited to cracking, rutting, faulting, ponding, spalling and ravelling (i.e. ongoing separation of aggregate particles in a pavement). The condition of the pavement can be determined by assessing the type, extent, relative and absolute location, and severity of each of these different types of distresses, and remedial measures can be applied to fix these problems. In addition, it is also important to measure the roughness and texture of pavements periodically. Textures helps to measure the skid resistance, and roughness measures the level of traveler comfort and impact on fuel efficiency.

Pavement surface conditions are usually assessed using survey vehicles which continually collect pavement surface data as they travel along their designated routes. A number of pavement condition assessment systems have been built in the past four decades. These systems use different sensors to digitize the road surface and roughly fall under one of the following two categories:

(1) Imaging systems, which use a camera or sets of cameras and lighting systems to record a view of the pavement surface. These systems usually use high resolution line scan cameras for accurate imaging. The individual lines scanned by the camera are stitched after some distance to get a two-dimensional image of the area scanned. They capture an entire area of the lane in which the survey vehicle is travelling in. Surface data captured with these systems are usually used for distress detection. However, these systems are two-dimensional (2D) as opposed to three-dimensional (3D).

(2) Profiling systems, which use laser triangulation, ultrasound or other time of flight sensors to record the elevation map of the pavement surface. These systems do not measure the entire surface of the road, but rather produce profiles at fixed intervals along a fixed number of lines on the road. While these systems are highly accurate and measure discrete points across the surface of the road, these systems take discrete measurements and therefore do not by their nature take images, as the 2D imaging systems described above do.

The recorded road surface is then either assessed manually or automatically according to various pavement assessment standards.

Stereoscopy is the extraction of three dimensional (3D) elevation information from digital images obtained by imaging devices such as CCD and CMOS cameras. By comparing information about a scene from two vantage points, 3D information can be extracted by examination of the relative position of objects in the two panels. This is similar to the biological process Stereopsis, a process by which the human brain perceives the 3D structure of an object using visual information from two eyes.

In the simplest form of the technique, two cameras displaced horizontally from one another are used to obtain two differing views on a scene. By comparing these two images, the relative depth information can be obtained, in the form of disparities, which are inversely proportional to the differences in distance to the objects. To compare the images, the two views must be superimposed in a stereoscopic device or process.

For a two camera stereoscopic 3D extraction technique, the following steps are performed:

(a) Image Rectification: Transformation matrix $R_{rect}$ transforms both the images to one common plane of comparison is identified. The left camera image is rectified by applying $R_{rect}$ and the right camera image by applying $R*R_{rect}$ to all the pixels.

(b) Disparity Map generation: For each pixel on the left camera image a matching pixel along the same scan line is identified on the right camera image using a localized window based search technique. For each pixel, $p_l(x,y)$ in the left image, the system and method identifies the matching pixel $p_r(x+d,y)$ in the right pixel where d is the pixel disparity.

(c) 3D reconstruction: At each point $d_{(x,y)}$ in the disparity map, the system and method calculates the elevation $Z_{(x,y)}$ by triangulation.

Stereoscopy has been used for pavement quality assessment in U.S. Pat. No. 8,306,747. The system utilizes Ground Penetrating Radar (GPR) along with stereo area scan cameras to obtain high resolution images, and is not designed for operation at highway speeds. The system also does not use the image data directly for distress detection and measurement.

Techniques similar to multiple-camera stereoscopy like photometric stereoscopy has also been used in pavement assessment in Shalaby et al. ("Image Requirements for Three-Dimensional Measurements of Pavement Macrotexture", Journal of the Transportation Research Board, Issue Volume 2068/2008, ISSN 0361-1981.) However, the system uses a conventional camera with four single point light sources, and is not designed for high-speed operation. The technique is used to characterize pavement surface textures.

Stereoscopic imaging has also been used for inspection of objects on a conveyor belt using both individual photosensors (U.S. Pat. No. 3,892,492) or using a line-scan camera (U.S. Pat. Nos. 6,166,393 and 6,327,374). They are also specifically designed to identify defective rapidly moving objects moving on a conveyor belt past a stationary sensor system, rather from a moving platform for road pavement evaluation.

What is therefore needed is an improved system and method for pavement scanning that overcomes some of the disadvantages of the prior art.

SUMMARY

The present disclosure relates to a high speed pavement stereoscopic line scan imaging system and method capable of producing a stereoscopic 3D image of the pavement surface using a stereoscopic image capturing apparatus, or any number of such devices and lighting source(s) for accurate detection of pavement distresses, and assessment of the pavement surface quality. The present system and method can be applied to capturing and assessment of any type of pavement or vehicle pathway surface, such as road pavements, bridge decks and airport runways and railways.

In an aspect, there is provided a mobile pavement surface scanning system for detecting pavement distress, comprising: one or more light sources mounted to a mobile vehicle for illuminating a pavement surface; one or more stereoscopic image capturing devices mounted to the mobile vehicle for capturing sequential images of the illuminated pavement surface; a plurality of positioning sensors mounted to the mobile vehicle, the positioning sensors adapted to encode movement of the mobile vehicle and provide a synchronization signal for the sequential images captured by the one or more stereoscopic image capture devices; and one or more computer processors configured to: synchronize the sequential images captured by each camera of the one or more stereoscopic image capturing devices; generate intensity image pairs from the synchronized sequential images; perform a 3D reconstruction of the illuminated pavement surface from the intensity image pairs using stereoscopic principles; generate a depth image and an intensity image pair from the 3D reconstruction; and process at least one of the depth image and the intensity image utilizing one or more distress detection modules to detect a type of pavement distress.

In an embodiment, the one or more distress detection modules comprise a computer vision module for detecting pavement distress utilizing at least one of the depth image and an intensity image pair.

In another embodiment, the one or more distress detection modules further comprise a machine learning module, and the computer vision module is adapted to generate a learning feed forward to the machine learning module.

In another embodiment, the one or more distress detection modules comprise a machine learning module for detecting pavement distress utilizing at least one of the depth image and an intensity image pair.

In another embodiment, the machine learning module includes a learning feedback loop to enable the machine learning module to improve detection of pavement distresses.

In another embodiment, the machine learning module comprises an artificial intelligence (AI) engine executing a learning algorithm to detect and classify distresses based on its iterative training.

In another embodiment, the machine learning module is adapted to provide a feedback signal to dynamically change a parameter of a component on the mobile vehicle for capturing the sequential images on the illuminated pavement surface, such as the one or more light sources, one or more stereoscopic image capturing devices, and filters.

In another embodiment, the machine learning module is adapted to select a type of image processing filter in dependence upon the type of pavement distress being detected.

In another embodiment, the machine learning module is adapted to categorize the type of pavement distress detected, and to store the geo-reference for the detected pavement distress in real time as the survey data is stored.

In another aspect, there is provided a method of scanning a pavement surface for detecting pavement distress, comprising: providing one or more light sources mounted to a mobile vehicle for illuminating pavement surface; providing one or more stereoscopic image capturing devices mounted to the mobile vehicle for capturing sequential images of the illuminated pavement surface; providing a plurality of positioning sensors mounted to the mobile vehicle, the positioning sensors adapted to encode movement of the mobile vehicle and provide a synchronization signal for the sequential images captured by the one or more stereoscopic image capture devices; and providing one or more computer processors configured to: synchronize the sequential images captured by each camera of the one or more stereoscopic image capturing devices; generate intensity image pairs from the synchronized sequential images; perform a 3D reconstruction of the illuminated pavement surface from the intensity image pairs using stereoscopic principles: generate a depth image and an intensity image pair from the 3D reconstruction; and process at least one of the depth image and the intensity image utilizing one or more distress detection modules to detect a type of pavement distress, as described above for the corresponding system.

Further features will be evident from the following description of preferred embodiments. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways and equivalents to the embodiments. Also, it is to be understood that the phraseology and terminology employed herein are for the purpose of description and should not be regarded as limiting.

DETAILED DESCRIPTION OF THE INVENTION

As noted above, the present disclosure relates to a system and method for collecting a high resolution 3D image of the pavement surface at high speed, and utilizing the captured 3D image for detection, classification and analysis of pavement distresses. The purpose of the system and method is to collect information that allows a more accurate measurement of various different modes of distress that have formed on a road pavement surface. These measurements can then be used to manually or automatically assess road condition, such as cracking, roughness, smoothness, rutting and both micro and macro surface texture.

In an embodiment, with reference to FIGS. 1 to 4B, the proposed system is mounted to a survey vehicle, and comprises a number of elements: (1) A number of high brightness illumination units, suitably two LED sources 130A and 130B (in an embodiment, these may be of blue wavelength ranging from about 450 nm to 495 nm, and more preferably around 480 nm, but other colors and corresponding wavelengths may be used); (2) A number, suitably two, of stereoscopic image capture devices 104A and 104B which may include pairs of high speed line scan cameras 120A & 120B, 120C & 120D, and frame grabbers 150A and 150B with each of the cameras externally fitted with an optical filter 103A, 103B; (3) A combination of wheel-encoder 105A, GPS 105B and IMU 105C mounted to the vehicle allowing movement detection; and (4) A data-storage 510 and processing 520 means.

In an embodiment, the light sources 130A, 130B used to illuminate an area of interest are adapted to receive a trigger pulse to synchronize the output of the light sources 130A, 130B with the image capturing device. The intensity of the light output by the light sources 130A, 130B may be modified depending on the amount of illumination a pavement surface requires, in order to synchronize with the image capturing device and capture images with a suitable level of contrast. The intensity of the light output by the light sources 130A, 130B may also be controlled by an exposure level sensor, such as an exposure level meter built into the camera providing a feedback signal. The camera lens aperture and the sensitivity of the camera image sensor may also be controlled in order to obtain a proper level of exposure for a given lighting condition.

The illumination system 130 may be one very powerful illumination source that covers the entire width of a pavement surface of interest, or multiple illumination sources comprising one or more LED sources 130A, 130B that together cover the width of the pavement surface of interest.

Figure 1:
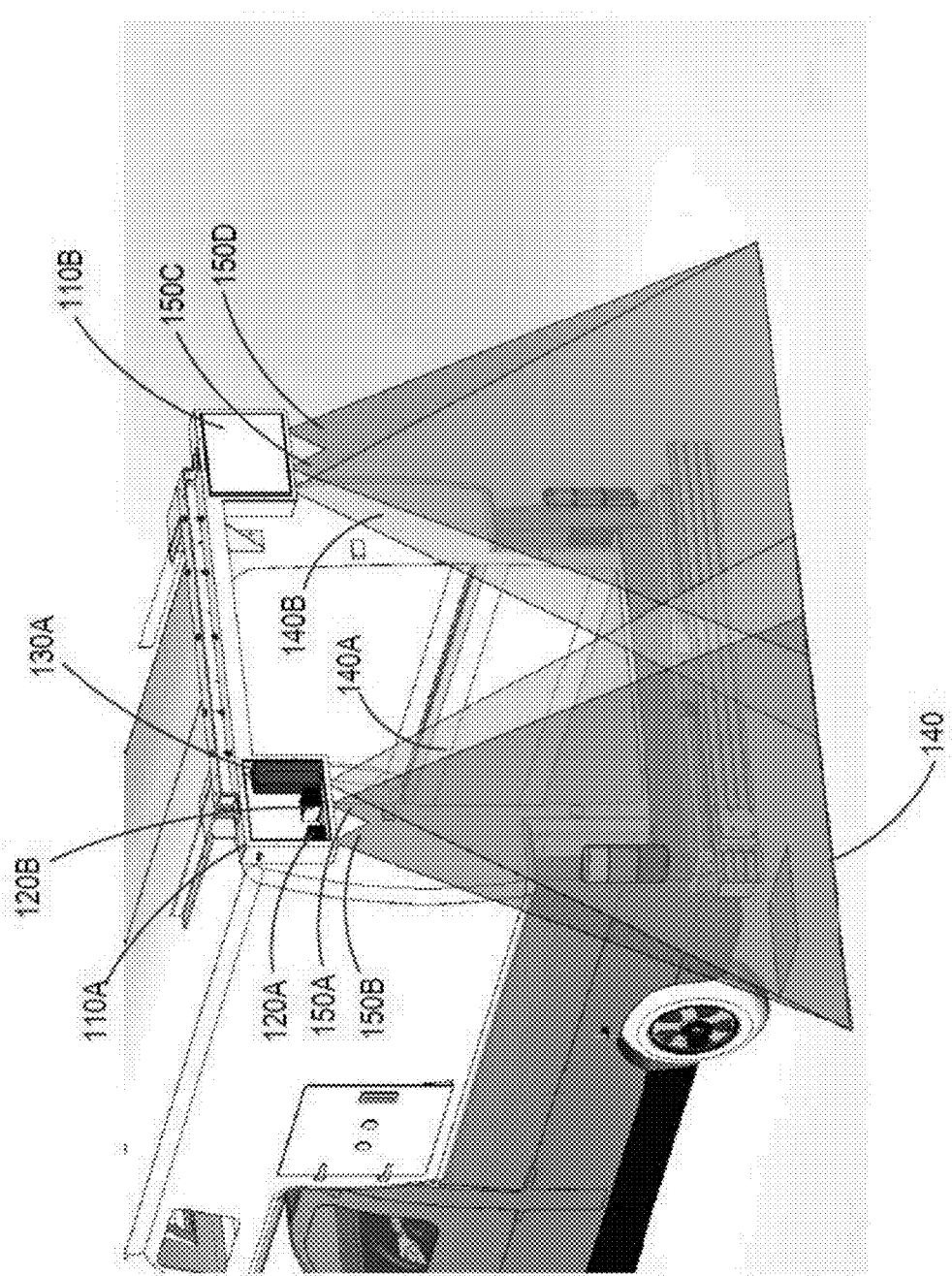
FIG. 1 shows one possible configuration of the scanning system mounted on the survey vehicle. The system shown has two pairs of stereoscopic line-scan cameras and two light sources in accordance with an illustrative embodiment.

When multiple sources are used, each source may be fitted together with an image capturing device, and housed together in a cabinet to be protected from environmental damages, as shown by way of example in FIG. 1. One or more supplemental illumination sources positioned separately from the cabinet may also be used as necessary in order to achieve proper illumination of the pavement surface. FIG. 1 shows an illustrative vehicle mounted system with two such cabinets 110A, 110B which are mounted at the upper left corner and upper right corner of the rear of the vehicle. As shown, these two units may be interconnected via cables through a ducted frame holding the two cabinets in position. The two light sources 130A and 130B continuously illuminate the width of the pavement as the vehicle travels forward, in order to allow the one or more stereoscopic image capture devices to record a sequence of pavement surface images.

When multiple sources are used, a part of the width of the pavement illuminated by one source may overlap with the width illuminated by the others as shown in FIG. 1. In FIG. 1 coverage width 140 is obtained by coverage width 140A from a first light source 130A which partially overlaps with coverage width 140B from a second light source 130B inside the second cabinet 110B.

In an embodiment, the orientation of the light source 110 with respect to the pavement surface is determined by the cabinet. Inside the cabinet, the light source is placed with no rotation, with the beam parallel to one of the long faces of the cabinet as shown in FIG. 1. The light sources 130A, 130B may also be positioned at appropriate angles and distances relative to each other in order to provide optimal lighting conditions for obtaining a sufficiently high contrast image of the pavement surface features.

Figure 2:
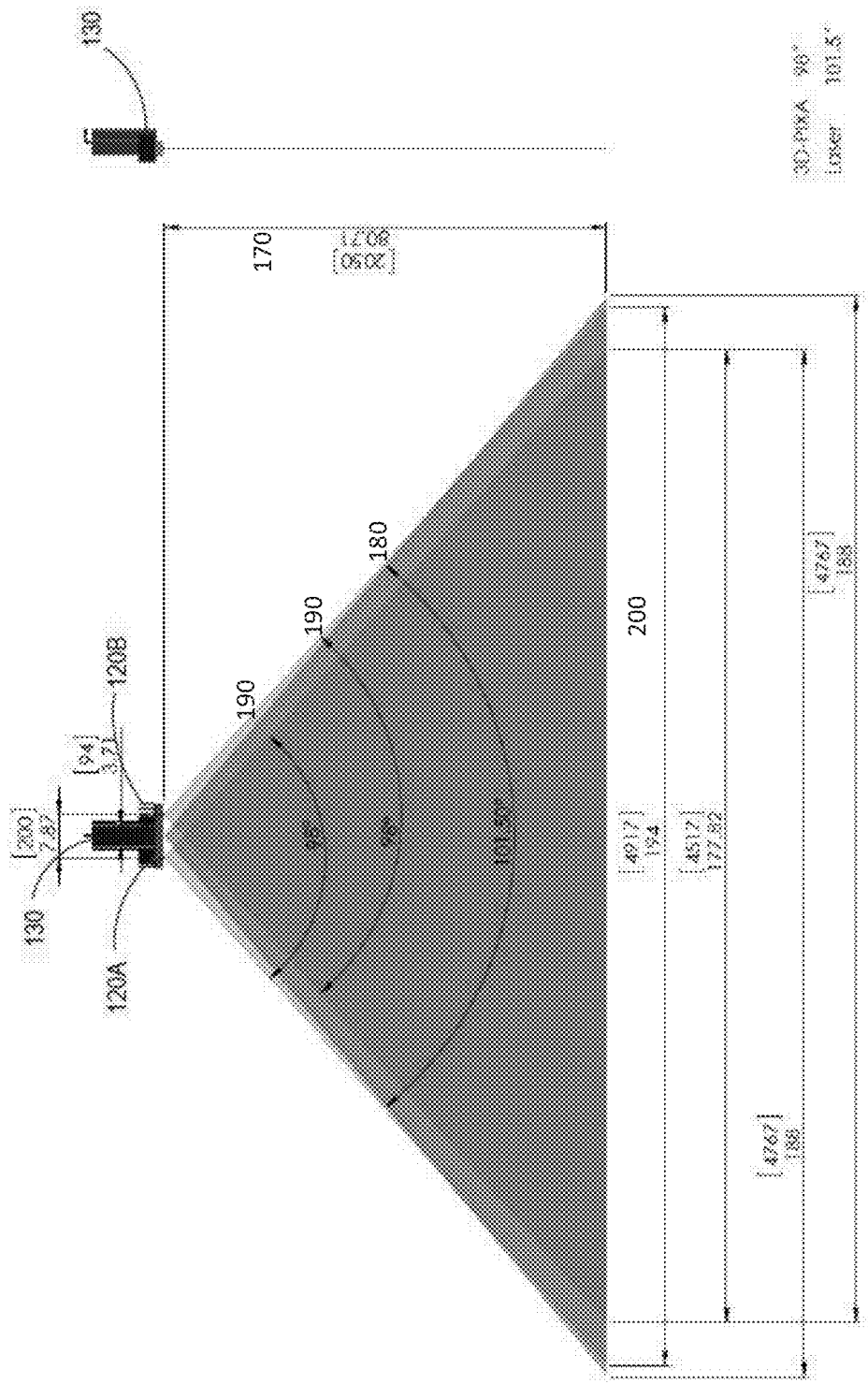
FIG. 2 is one possible configuration of a stereoscopic line-scan camera pair and a light source shown together in accordance with an illustrative embodiment.

The image capturing system 104, may be one wide-angle stereoscopic image capturing device or multiple medium-angle or narrow-angle devices that capture the width of the pavement. A stereoscopic image capturing device 104A consists of at least two cameras, left camera 120A and right camera 120B. Both the left and right cameras capture almost the same width of the pavement 140A and 140B, as shown in FIG. 1 and FIG. 2, which forms the basis of 3D depth (range) estimation using stereoscopic principles. Each camera may be a single integrated unit or a separate high speed line scan camera 120 and frame grabber 150 A and 150B.

Depending on the width 140 of the pavement surface to be captured and the width 140A, 140B that a single stereoscopic pair can capture, multiple similar pairs may be used as shown in FIG. 1. Similar to the illumination system, when multiple image capturing devices are used, the width of the pavement captured by one stereoscopic pair may overlap with the width captured by the others as shown in FIG. 1.

Each of the cameras in a stereoscopic camera pair may be fitted with an optical filter or lens filter 103A and 103B externally or internally to overcome the environmental challenges like abnormal sunlight condition or wet pavements.

Figure 4A:
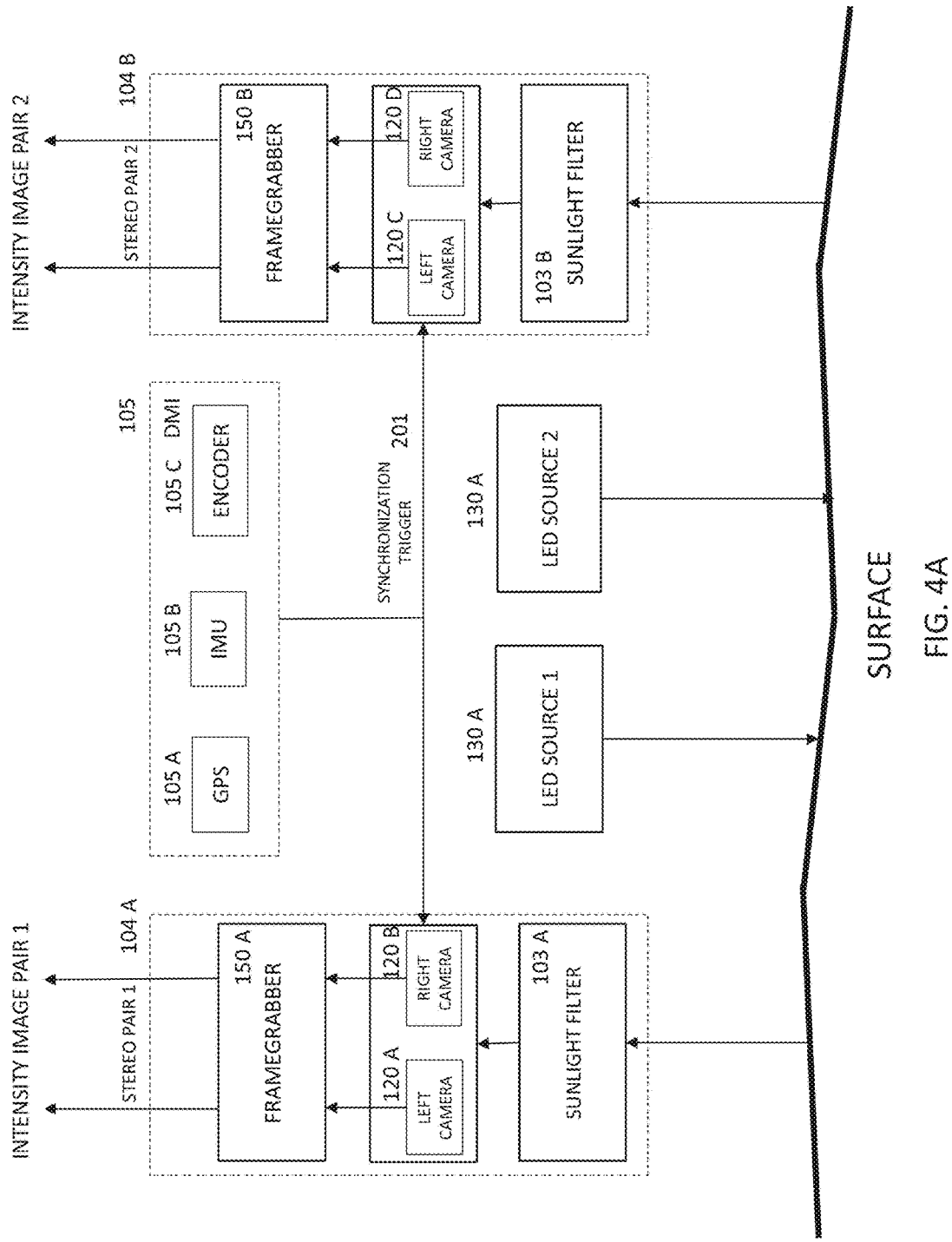
FIG. 4A is a schematic block diagram the data capture scheme used for the scanning system in accordance with an illustrative embodiment.

FIG. 4A shows one possible configuration of a Data Capturing System. The image capturing system with two high speed stereoscopic line scan camera pairs 104A and 104B, in combination with optical filters that are matched to the wavelength of the light source, 103A and 103B, captures the pavement surface at high resolution, using frame grabber cards 150A and 150B. The illumination system with two LED light sources 130A and 130B illuminates the pavement surface.

Figure 3:
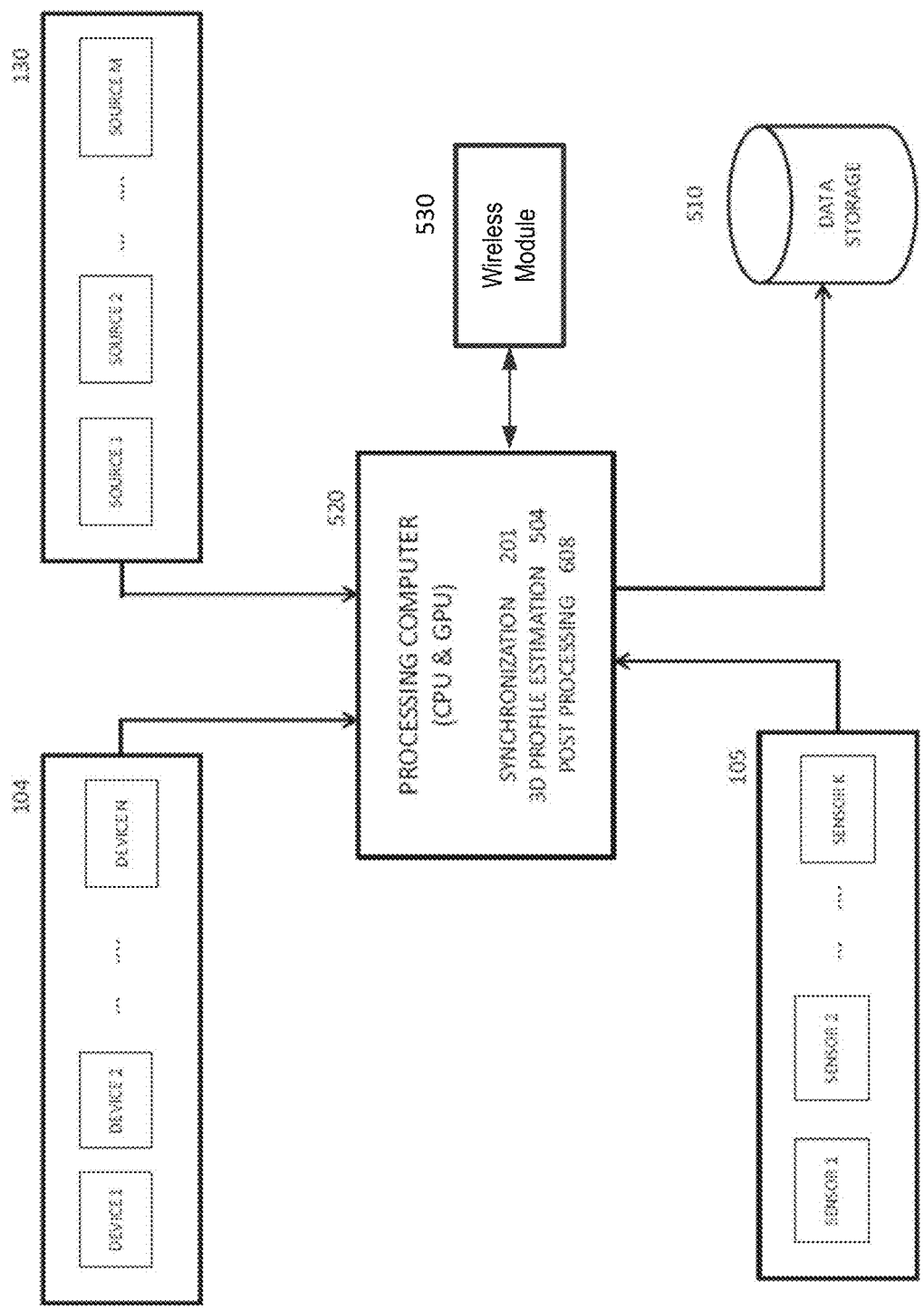
FIG. 3 is a schematic block diagram of the scanning system in accordance with an illustrative embodiment.
Figure 4B:
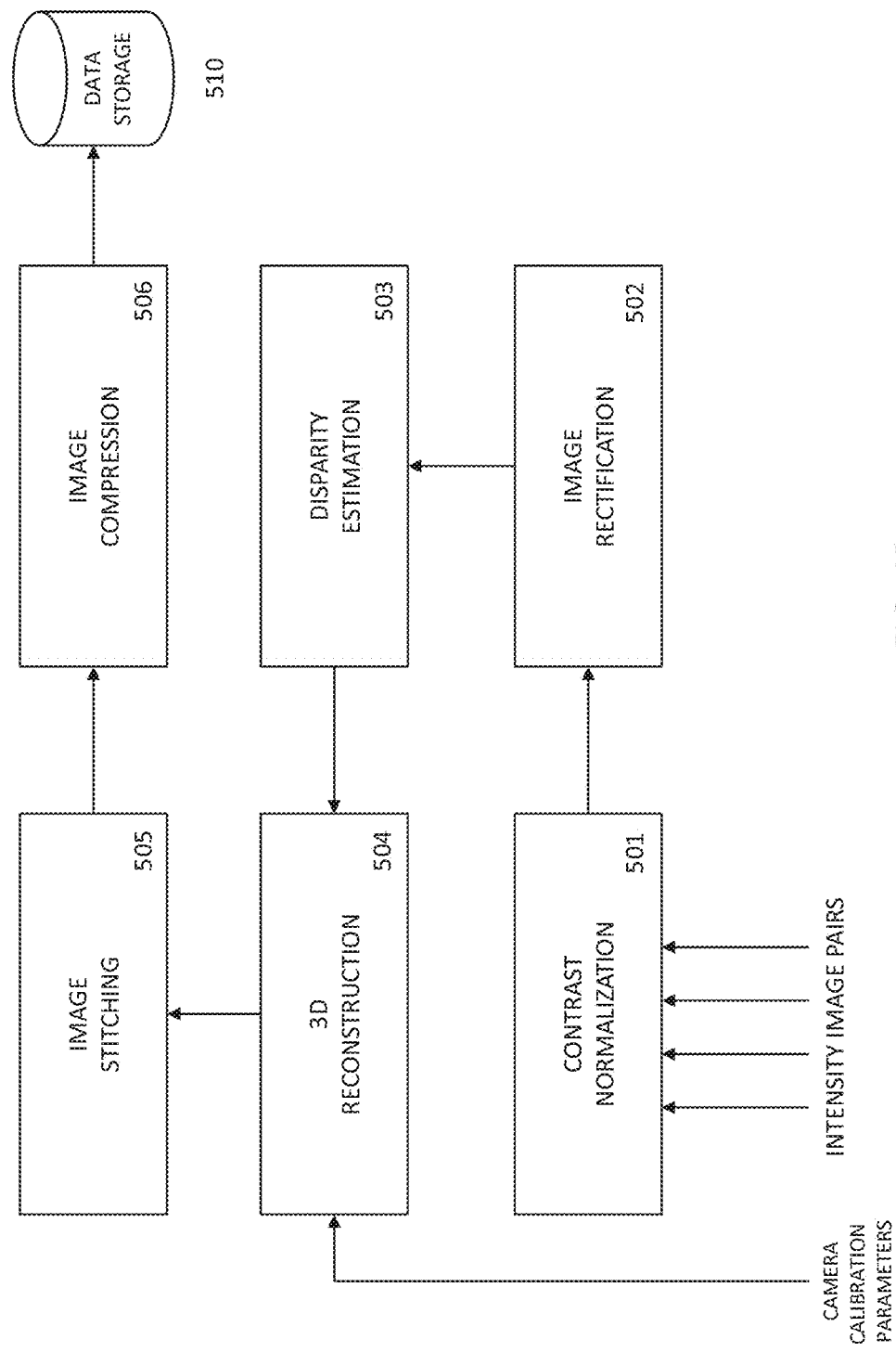
FIG. 4B. is a schematic block diagram of the image processing scheme used for the scanning system in accordance with an illustrative embodiment.

A combination of a Global Positioning System (GPS) 1.05A, inertial Measurement Unit (IMU) 105B and Wheel Encoder 105C, collectively referred to as Distance Measurement Instruments (DMI) 105, detects the movement of the system as shown in FIG. 3. The individual sensors are placed at different locations inside the survey vehicle. Together, they capture any movement of the survey vehicle such as longitudinal distance travelled, velocity in the direction of travel and angle of tilt relative to pavement surface. DMI also produces synchronization signals 201 based on distance travelled by the survey vehicle which is used to trigger the stereoscopic cameras for synchronized data capture independent of the vehicle velocity as shown in FIG. 4B. DMI may also produce the synchronization signals based on the time elapsed.

The movement data from the IMU is used to augment the data captured by the image capturing devices to correct for pavement abnormalities and obtain more accurate 3D estimates. For example, if the vehicle is travelling over an uneven surface or stretch of banked pavement which is angled to one side or when the vehicle bounces, the IMU data is used to account for the movement of the system relative to the pavement surface.

As the survey vehicle travels forward, the image capturing devices are triggered at equal distance or time intervals, in rapid succession, by the MIL In an embodiment, this trigger pulse may be generated using an encoder or vehicle speed sensor 105C, connected to the drive train or directly to the wheel. At each pulse, the individual cameras of a stereoscopic pair capture a line of pavement surface illuminated by the illumination source. The captured lines are then digitized into a line of grayscale intensities using the frame grabber card. The frame grabber captures a fixed number of such lines and stitches them together one line after another to form a two dimensional (2D) image.

Figure 5:
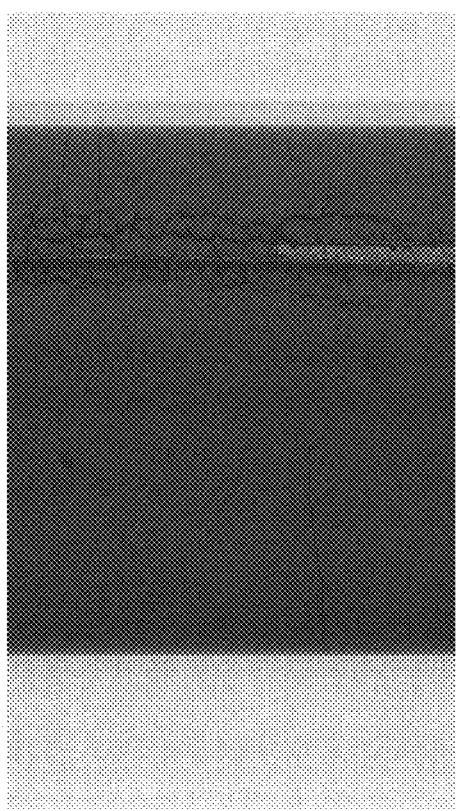
FIG. 5 shows sample grayscale images of a pavement surface captured by left and right cameras of a stereoscopic image capturing device in accordance with an illustrative embodiment.
Figure 5:
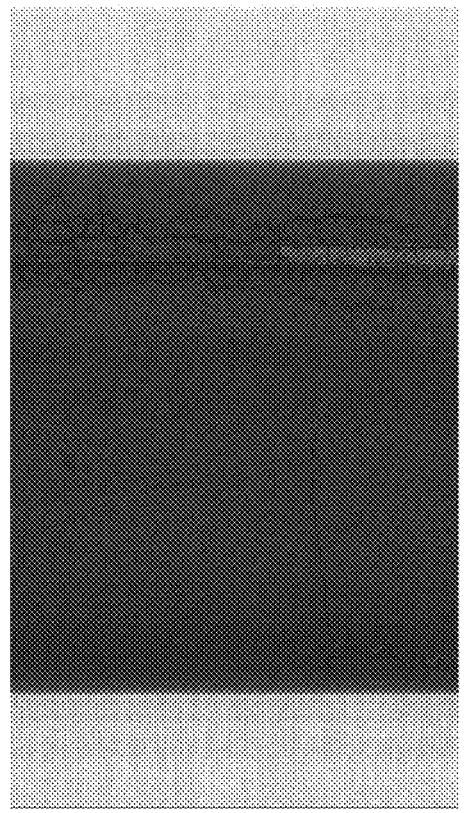
Figure 6:
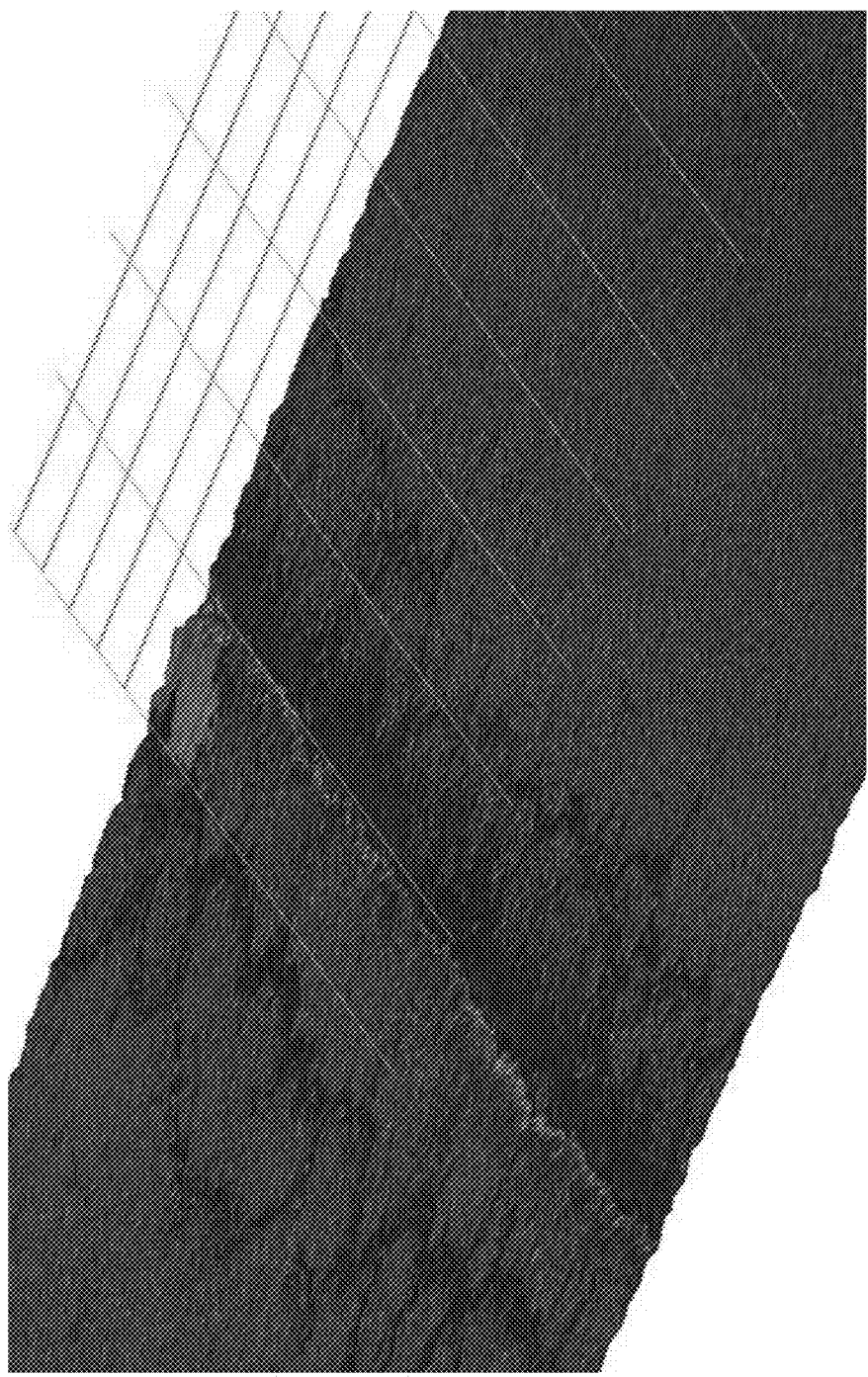
FIG. 6 shows a representative 3D image of the pavement surface obtained using the images shown in FIG. 5 in accordance with an illustrative embodiment.

In this illustrative embodiment using a pair stereoscopic cameras, the result is a set of four, time or distance synchronized, 2D intensity images containing image intensity data. The intensity images captured by the left and right cameras of one of the two stereoscopic pairs of a sample system are shown in FIG. 5.

At this stage, the images are processed and saved as shown in FIG. 49. Image processing comprises of external artifact removal 501, image rectification 502, disparity estimation 503, 3D depth (range) estimation 504, image stitching 505, and image compression 506. Image processing is performed on-board 520, as the vehicle travels. Alternatively these steps can be done in a post-processing stage. A wireless communications module 530 may also transmit survey data as a live stream feed to a remote location for storage and processing.

As shown in FIG. 4B, the first step in image processing is to reduce the effect of sunlight and shadows within the images. Initially, the optical filters on the stereoscopic cameras reduce the effects of sunlight. However to obtain good contrast images with accurate gradient estimates, further reduction of the effects of sunlight is often necessary. To rectify this problem, an ancillary image of the surface can be taken with no artificial lighting, only sunlight. This image with only sunlight illuminating the surface is then used to remove the effect of sunlight in the other images collected by the system. This is performed after each of the images has been aligned, as described previously. By subtracting the sunlight only image from the original images using digital processing, sunlight free images can be produced. This technique also removes the effect of imaging sensor DC bias. Alternatively, if an ancillary image without artificial lighting cannot be taken, this step may be replaced with simple contrast normalization techniques 501 which effectively spread out the most frequent intensity value.

Once the external artifacts have been removed from the images, the technique of stereoscopy is applied to the data. This produces the 3D elevation at each point on the pavement surface. The preferred technique uses images from two individual cameras of the stereo pair and for each point on the pavement, identifies the corresponding pixel on both the images and estimates the 3D elevation as a factor of relative pixel distance between the matching pixels. The stereo camera pairs are calibrated and the focal length (f), principal centers (P) of the individual cameras and the relative rotation (R) and Translation (T) between the two cameras are known.

The following steps are performed:

(a) The first step is Image Rectification 502. The system and method identifies a common $R_{rect}$ matrix that when applied will transform the left and right images to a common plane where they can be compared pixel to pixel. The system and method determines this $R_{rect}$ matrix using the Translation vector (T).

$$e_1 = \frac{T}{\|T\|} \quad e_2 = \frac{1}{\sqrt{T_x^2 + T_y^2}} [-T_y, T_x, 0]'$$

$$e_3 = e_1 \times e_2 \quad R_{rect} = \begin{bmatrix} e_1' \\ e_2' \\ e_3' \end{bmatrix};$$

The system and method rectifies the left image by applying the $R_{rect}$ matrix to each pixel in the image. For each pixel $p_l$, the system and method computes $R_{rect}*p_l$. Similarly the system and method rectifies the right image by applying $R*R_{rect}$ to each pixel. For each pixel, $p_r$, the system and method computes $R*R_{rect}*p_r$. This transforms both the images to one common plane for easy comparison.

(b) The next step is to generate a Disparity Map 503. For each pixel in the left image, the system and method identifies a matching pixel in the right image. Since the images are rectified, the search space to identify the matching pixel is limited to the corresponding scan line. The system and method uses a localized window based correlation technique to identify the matching pixels. For each pixel, $p_1(x,y)$ in the left image, the system and method identifies the matching pixel $p_r(x+d,y)$ in the right pixel where d is the pixel disparity.

(c) The final step is 3D reconstruction 504. At each point $d_{(x,y)}$ in the disparity map the system and method calculates the elevation $Z_{(x,y)}$ by triangulation.

$$z_{(x,y)} = \frac{T_x * f}{d_{(x,y)}}$$

Figure 7:
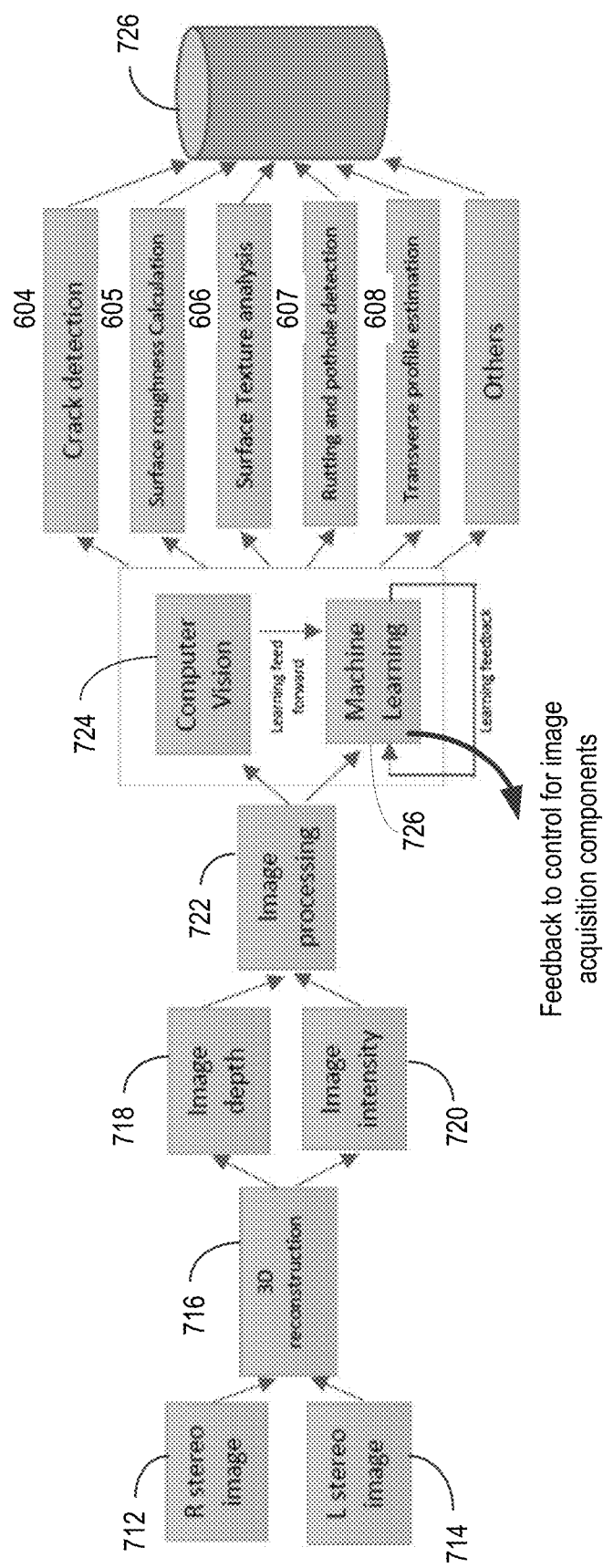
FIG. 7 shows a schematic block diagram of a process for utilizing intensity and depth images for detection, classification and analysis of pavement distresses.

The 3D pavement profile, obtained using the disparity image which is obtained using the grayscale images shown in FIG. 5, is shown in FIG. 7.

Once the 3D range maps are obtained from the stereo pairs, at 505, the system and method stitches the range maps obtained by the stereo pairs to obtain one 3D range map for the entire region of interest.

After image capturing, stereoscopic 3D reconstruction and image stitching, the images obtained are contrast normalized intensity images containing image intensity data (which may be gray scale), and 3D elevation/depth range images which are combined into a stereoscopic 3D image containing image intensity data. This stereoscopic 3D image is viewable as a 3D image rendered on a 2D computer monitor or screen, or viewable in stereoscopic 3D with suitable 3D glasses. With appropriate formatting as may be necessary, the 3D image may also be viewed in a virtual 3D environment, using a commercially available stereoscopic virtual reality viewer, for example. Such a virtual 3D viewing environment may render pavement distress features in the stereoscopic 3D image to be more readily noticeable, in comparison to a flattened rendering of a 3D image on a 2D computer monitor or screen. Once such a feature is identified, the viewing angle of the 3D image may also be manipulated to allow the pavement surface to be viewed from different points of view.

A file compression 506 technique such as GeoTIF, JPEG encoding, ZIP encoding and LZW encoding is applied to minimize the sizes of the combined stereoscopic 3D images, and save them to a data storage device 510 on board.

Figure 4C:
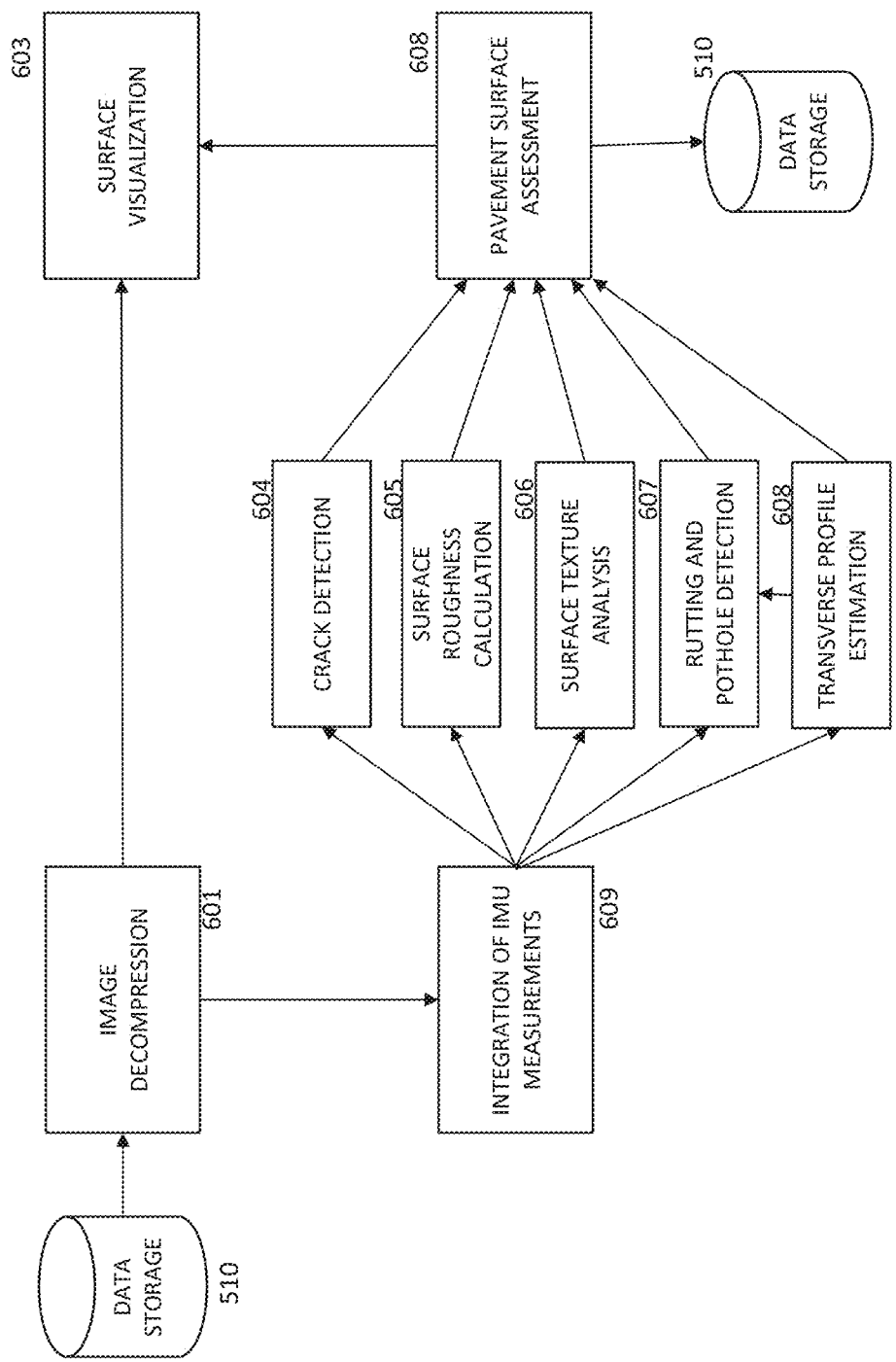
FIG. 4C. is a schematic block diagram of the data post-processing scheme used for the scanning system in accordance with an illustrative embodiment.

Any or all of the steps involved in image processing stage can be performed by one or multiple units of Central Processing Unit (CPU) 520A or Graphics Processing unit (GPU) 520B as shown in FIG. 4C.

At the post processing and extraction stage, the recorded data is retrieved from a data storage 510, decompressed 601, and then passed to a number of modules as shown in FIG. 4C.

The high resolution stereoscopic 3D image can be used to extract a number of pavement features. Through the automatic identification and classification of each of these features, an assessment of the road surface condition can be made 610. These include, but are not limited to:

(1) Identification of surface cracking (both sealed and unsealed) 604.
(2) Extraction of road roughness or smoothness 605.
(3) Identification of areas with low texture depth, which can be due to asphalt bleeding or polishing 606.
(4) Identification of pot holes and rutting 607.
(5) Identification of areas where there is surface depression or corrugation which can indicate areas of high moisture or voiding.
(6) Extraction of Transverse Profile for rutting estimation 608.
(7) Surface comparison between scans, allowing detection of surface change with time.
8) Identification and removal of spurious road targets such as sticks and other debris, which can confuse crack detection algorithms.
9) Identification of patches.
10) Identification of areas of water bleeding.

The 3D image can be used along with the contrast normalized intensity images containing image intensity data to improve the distress detection, especially, cracking 604. Cracks are identified both in the gradient and intensity images. Both the shape and intensity is then used to classify the features as cracks, sealed cracks or other road features. The main advantages over using just the 3D image is the ability to eliminate false targets, such as markings on the road. An example is an oil spill which is often incorrectly identified as a crack, as it will only appear within the intensity image, not the 3D range images. It also improves the identification of other surface features that could lead to false positives, such as road markings, wheel marks, sticks and other road debris.

Another highly useful element of the system is the ability to identify sealed distresses like sealed cracks. Cracks are often sealed using bitumen, which to a normal surface image camera still appear as a dark line within the image. With the stereoscopic 3D image estimation technique it is possible to detect the presence of the flat bitumen surface in contrast to the depression caused by an unsealed crack.

Modules may also employ Machine Learning techniques to detect the distresses. The modules, instead of employing a series of mathematical calculations with hard-coded constants (heuristic methods), learn the shape and structure of the distresses from manually labelled historical data and try to predict the presence of distress on the captured pavement image. Each distress type has unique characteristics and it repeats wherever the distress appears again. Machine learning based modules are proven to be more accurate than heuristic method employing methods for detecting objects in an image.

In the display module 603, the data produced can be displayed directly to the user on the on-board monitor. The display module may display just the intensity image or a combined intensity image and 3D elevation image. According to the user preferences, the module may also display the detected distresses overlaid on the intensity image. The distresses displayed may be color-coded in different colors to indicate the level of severity.

Now referring to FIG. 7, shown is a schematic block diagram of a system and method for utilizing intensity and depth images for detection, classification and analysis of pavement distresses. First describing the system and method at a high level, FIG. 7 discloses an illustrative system and method in which left and right stereo images 712, 714 are acquired by a vehicle mounted system as described in the specification. The system and method then proceeds to a 3D reconstruction block 716. From this block, the system and method proceeds to generate both a depth image 718 and an intensity image 720. The depth and intensity images 718, 720 then undergo image processing 722. Processed images are provided as an input to processing utilizing a computer vision module 724, and a machine learning module 726. These modules 724, 726 then detect, classify, and record details of the different types of pavement distresses, including crack detection, surface roughness calculation 605, surface texture analysis 606, rutting and pothole detection 607, transverse profile estimation 608, and other types of pavement distresses. These results are then processed for storage 728 for recall and possible further analysis. The system and method will now be described in more detail, with reference to FIG. 7 and earlier figures.

It will be understood that the system and method may be embodied on a processor, such as illustrated in FIG. 3, and the processor may be integrated, whether wired or wirelessly, with image capture modules and sensors as provided on board a survey vehicle. It will be understood that any reference to a system or to a method as executed on the system may involve theses processors and modules as previously described.

As shown in FIG. 7, L & R stereo raw images 712, 714 are acquired by a vehicle mounted system as described above. A 3D reconstruction 716 of the pavement is then performed utilizing stereoscopic principles, and extracting from the stereo raw images 712, 214 the information relating to pavement distresses in order to generate a depth image 718, and an intensity image 720.

Capturing a stereoscopic L & R image pair of raw images 712, 714 enables retrieval of a 3D representation of the scanned pavement surface without losing any details. For example, several different types of distresses only manifest themselves in term of height differences, without any other really noticeable noticeable features. The 31) sensors of the present vehicle mounted system collect the necessary data to detect these distresses in x, y and z dimensions. These 3D sensors of the vehicle mounted system, in combination with the detection and classification processes as now described, allows extraction of highly accurate detailed features of pavement distresses, using 3D depth measurements in combination with imaging.

Once the depth image 718 and intensity image 720 are generated, and image processing step 722 is utilized to ensure that the images are correctly sized and oriented for further processing. The depth and intensity images 718, 720 can be utilized either in one of or both of two pathways to detect pavement features—i.e. the depth and intensity images 718, 720 can be processed by traditional computer vision techniques 724 and/or can be fed to a machine learning algorithm 726.

With computer vision algorithms 709, the system and method can detect pavement features using deterministic analysis. These computer vision algorithms 724 try to capture all pavement distresses visible in the input data, and are used to detect a set of pavement features. This algorithmic process is achieved through amplifying features using a combination of filtering techniques such as Gaussian filter, Gabor filter, Thresholding, and Laplacian filter. This is followed by edge detection of Harris corners to isolate the features, and then a local binary pattern operator is used. All of these filtering methods have in common an objective to highlight the photometric and geometric aspect of the distress.

These computer vision algorithms 724 may detect distresses such as, but not limited to, cracks, potholes, rutting and transverse profiling, bleeding, and patching. As these distresses are detected, the system and method geo-references them in the survey scan data such that their location is accurately recorded. As some distress features are more suitable to be detected and extracted from the intensity image and some feature are extracted from the range image, the system and method may be configured to prefer one image over another for identifying different features. The results are combined together and used to categorize the distress features into one of a number of classes 604-608.

Still referring to FIG. 7, a machine learning module 726 is adapted to perform pavement distress detection in conjunction with, or in addition to, the computer vision algorithms 724. In an embodiment, the machine learning module 726 comprises an artificial intelligence (AI) engine executing a learning algorithm to detect and classify distresses in images received from the image processing block 722. This process allows for learning through feedback to automatic improvement of pavement feature detection by comparing calculated detection results with positive identification of the actual distresses.

In an embodiment, the machine learning module 726 can be configured to provide feedback in real time to change a parameter of a component on the survey vehicle, in order to address lack of image quality, or to optimize image collection given changing survey conditions and the operating environment. For example, the machine learning module feedback signal can be processed to change a parameter of one or more lighting modules to achieve better contrast. As another example, a parameter on the one or more stereoscopic cameras may be changed to obtain better quality images for detecting a particular type of pavement distress. As the machine learning module 726 can learn over time which parameters would optimize image capture and processing for a given type of pavement distress in a given survey environment, accurate pavement distress detection performance should improve over time.

In an embodiment, the learning algorithm may be supervised to leverage the most advanced features of computer vision and machine learning. For example, the algorithm can learn from a set of input data that has been labeled to build a new generalized model which captures the patterns inside the image data that describes a distress.

The distress detection process can be framed as either an object detection task or an instance segmentation task. In an object detection approach, the goal is to place a tight-fitting bounding box around each defect in the image. In an image segmentation approach, the problem is essentially one of pixel classification, where the goal is to classify each image pixel as a defect or not. Instance segmentation is a more difficult variant of image segmentation, where each segmented pixel must be assigned to a particular casting defect.

Many state-of-the-art object detection systems can be used such as region-based convolution neural network (R-CNN), which creates bounding boxes, or region proposals, using a process called selective search. At a high level, selective search looks at the image through windows of different sizes and, for each size, tries to group together adjacent pixels by texture, color, or intensity to identify objects. Once the proposals are created, R-CNN warps the region to a standard square size and passes it through a feature extractor. A support vector machine (SVM) classifier is then used to predict what object is present in the image, if any. Using a different approach, such as region-based fully convolutional networks (R-FCN), each component of the object detection network is replaced by a deep neural network.

In an embodiment, part of the distress detection algorithm is based on the mask region-based CNN (Mask R-CNN) architecture. This architecture simultaneously performs object detection and instance segmentation, making it useful for a range of automated inspection tasks.

The advantage of using convolution neural networks (CNN) is that, over time, the system is learning the intrinsic representation of the input data given. The features are then extracted automatically and identified by the neural network. In a CNN, pixels from each image are converted to a featurized representation through a series of mathematical operations. The input sequentially goes through a number of processing steps, commonly referred to as layers. By combining multiple layers, it is possible to develop a complex nonlinear function which can map high-dimensional data (such as images) to useful outputs (such as classification labels). Deep neural networks are, by design, parameterized non-linear functions.

Depending on the type of distresses, a different Machine learning algorithm may be applied. Binary trees type of algorithms, such as AdaBoost or Random Forest are also used in order to perform classification.

The results of the learning process will be a trained machine learning model that can be executed on an input image set to discover a detailed descriptions of the targeted type of pavement distress. The images used in this process, depending of the type of distress, are both intensity images and depth images. The algorithm is thus learning the structure of the pavement distress. A trained machine learning model can detect and geo-reference distresses such as, but not limited to, cracks, potholes, rutting and transverse profiling, bleeding, and patching. This detection dataset is then used in an "online learning process" to continuously improve the accuracy of the model.

With dedicated hardware, the system and method can survey and detect pavement distresses in real time, and with continuous training, the system and method can improve the model constantly, which can become very powerful over time. With this process, the model learns in a sequential manner, and can adapt locally to survey conditions and the type of pavement surface being surveyed, such that the detection algorithm will be influenced more by recent observations in similar conditions, than by older observations or observations from significantly different surfaces. Optionally, in order to be sure that the learning algorithm is making the right choice, a review process can be performed to determine that the detection of the pavement distresses is accurate.

In an embodiment, depending on the type of distresses to be identified, the algorithm can use computer vision matched filtering techniques. Each image pixel is classified as a defect or treated as not being a defect, depending on the features that are computed from a local neighborhood around the pixel. Common features include, for example, statistical descriptors (mean, standard deviation, skewness, kurtosis, localized wavelet decomposition, Taylor expansions, Bezier fits or any other type of polynomial parameterization.

In an embodiment, the algorithm is adapted to used a combination of computer vision and machine learning, called learning feed-forward, as labeled in FIG. 7. A computer vision algorithm is used in a "pre-processing" phase in the raw image (first part), and the output of this first step will be used as input for the machine learning algorithm. This enables the computer vision algorithm to first detect and classify a pavement distress, and allow the machine learning algorithm to perform a verification step though its ever-increasing knowledge database, either agreeing with the computer vision algorithm, or possibly coming to different conclusions, requiring further analysis to determine which is correct.

In another embodiment, a learning feedback loop is implemented as a core part of the machine learning module 726. Acquired images of the surveyed pavement surface are used to constantly keep training the machine to improve, based on newly collected images of the pavement. Advantageously, the model used by the machine learning algorithm is updated consistently, and the inference detection uses the most recent model. By processing the analysis in realtime on hoard a vehicle, the learning feedback can also provide feedback to the system to make adjustments for capturing images, or for adjusting parameters to obtain better images for more accurate detection of different types of pavement distresses.

Once the pavement has been classified through one or both techniques, the information is stored to a database at 728 for retrieval and further analysis as may be required, whether on board the vehicle, or transmitted by use of a wireless communication module (e.g. wireless module 530 of FIG. 3) to a remote location.

Illustrative Use Cases

A number of illustrative use cases will now be described to provide examples of how the present system and method may be used in practice to detect pavement distresses.

Cracks: The input to the machine learning algorithm is the depth image and the accuracy of the training is highly dependent on the quality of the depth image. The quality of depth image may vary depending on several external factors such as bad lighting, lose calibration or extreme weather conditions. The system is designed to overcome these challenges by constantly training and readjusting of the weights every time a new dataset is collected. Through the system, cracks could be further classified into regular, sealed, longitudinal, transverse and alligator cracks. Further post processing like finding connected pixel components and contour methods is applied to classify cracks to different categories.

Potholes: The system and method uses the depth information of pavement as a feature to identify the potholes on road. What really separates potholes from cracks is the surface area and the depth is large compared to the cracks. The system and method uses initial image filtering as a preprocessing step to eliminate the noise component in the depth image. The next step would be to use image processing techniques like dilation to separate the pixels values belonging to the potholes. The system and method applies a generalized threshold value to mask out pot holes in the binary image. Further post-processing is applied to classify the potholes as low, medium and high severities based on the diameter.

Rutting and Transverse Profiling: Rutting is the depression left on road in the wheel path and to measure this—the system and method uses the depth image. Preprocessing is done on depth image such as noise filtering. Rut is identified by finding the depth pixels in wheel path within a certain threshold. The minimum of 12 points or depth connected pixels are required to define a rut. Transverse profiling is the measure of unevenness on the pavement surface calculated similar to rut.

Bleeding: The main characteristic of bleeding is the tacky shiny surface on the road due to accumulation of liquid bituminous material. This is identifiable by processing the intensity image. As a preprocessing step, the system and method applies a Gaussian filter to spread the intensity evenly across the image and then the system and method takes the histogram of pixels spread across the image and choose a threshold to filter out the dark and light pixels connected over a certain length.

Patching: The system and method uses depth images to identify the patching on pavement which is area of surface that have been removed and replaced or where additional material has been placed to cover cracking or other distress. The main feature used here is the depth value over the certain area of the image is nearly the same than rest of the image. Preprocessing step such as filtering is applied to remove the noise. Also, the contrast in color change will be used as a feature in intensity image as the patch could be added to an old pavement with new material. The system and process can combine the depth value of 3D image and color value of intensity image to identify the patch.

Thus, in an aspect, there is provided a mobile pavement surface scanning system for detecting pavement distress, comprising: one or more light sources mounted to a mobile vehicle for illuminating a pavement surface; one or more stereoscopic image capturing devices mounted to the mobile vehicle for capturing sequential images of the illuminated pavement surface; a plurality of positioning sensors mounted to the mobile vehicle, the positioning sensors adapted to encode movement of the mobile vehicle and provide a synchronization signal for the sequential images captured by the one or more stereoscopic image capture devices; and one or more computer processors configured to: synchronize the sequential images captured by each camera of the one or more stereoscopic image capturing devices; generate intensity image pairs from the synchronized sequential images; perform a 3D reconstruction of the illuminated pavement surface from the intensity image pairs using stereoscopic principles; generate a depth image and an intensity image pair from the 3D reconstruction; and process at least one of the depth image and the intensity image utilizing one or more distress detection modules to detect a type of pavement distress.

In an embodiment, the one or more distress detection modules comprise a computer vision module for detecting pavement distress utilizing at least one of the depth image and an intensity image pair.

In another embodiment, the one or more distress detection modules further comprise a machine learning module, and the computer vision module is adapted to generate a learning feed forward to the machine learning module.

In another embodiment, the one or more distress detection modules comprise a machine learning module for detecting pavement distress utilizing at least one of the depth image and an intensity image pair.

In another embodiment, the machine learning module includes a learning feedback loop to enable the machine learning module to improve detection of pavement distresses.

In another embodiment, the machine learning module comprises an artificial intelligence (AI) engine executing a learning algorithm to detect and classify distresses based on its iterative training.

In another embodiment, the machine learning module is adapted to provide a feedback signal to dynamically change a parameter of a component on the mobile vehicle for capturing the sequential images on the illuminated pavement surface.

In another embodiment, the feedback signal is processed to change a parameter of the one or more light sources mounted to the mobile vehicle.

In another embodiment, the feedback signal is processed to change a parameter of the one or more stereoscopic image capturing devices.

In another embodiment, the machine learning module is adapted to select a type of image processing filter in dependence upon the type of pavement distress being detected.

In another embodiment, the machine learning module is adapted to categorize the type of pavement distress detected, and to store the geo-reference for the detected pavement distress in real time as the survey data is stored.

In another aspect, there is provided a method of scanning a pavement surface for detecting pavement distress, comprising: providing one or more light sources mounted to a mobile vehicle for illuminating a pavement surface; providing one or more stereoscopic image capturing devices mounted to the mobile vehicle for capturing sequential images of the illuminated pavement surface; providing a plurality of positioning sensors mounted to the mobile vehicle, the positioning sensors adapted to encode movement of the mobile vehicle and provide a synchronization signal for the sequential images captured by the one or more stereoscopic image capture devices; and providing one or more computer processors configured to: synchronize the sequential images captured by each camera of the one or more stereoscopic image capturing devices: generate intensity image pairs from the synchronized sequential images; perform a 3D reconstruction of the illuminated pavement surface from the intensity image pairs using stereoscopic principles; generate a depth image and an intensity image pair from the 3D reconstruction; and process at least one of the depth image and the intensity image utilizing one or more distress detection modules to detect a type of pavement distress.

In an embodiment, the one or more distress detection modules comprise a computer vision module for detecting pavement distress utilizing at least one of the depth image and an intensity image pair.

In another embodiment, the one or more distress detection modules further comprise a machine learning module, and the computer vision module is adapted to generate a learning feed forward to the machine learning module.

In another embodiment, the one or more distress detection modules comprise a machine learning module for detecting pavement distress utilizing at least one of the depth image and an intensity image pair.

In another embodiment, the machine learning module includes a learning feedback loop to enable the machine learning module to improve detection of pavement distresses.

In another embodiment, the machine learning module comprises an artificial intelligence (AI) engine executing a learning algorithm to detect and classify distresses based on its iterative training.

In another embodiment, the machine learning module is adapted to provide a feedback signal to dynamically change a parameter of a component on the mobile vehicle for capturing the sequential images on the illuminated pavement surface.

In another embodiment, the feedback signal is processed to change a parameter of the one or more light sources mounted to the mobile vehicle.

In another embodiment, the feedback signal is processed to change a parameter of the one or more stereoscopic image capturing devices.

In another embodiment, the machine learning module is adapted to select a type of image processing filter in dependence upon the type of pavement distress being detected.

In another embodiment, the machine learning module is adapted to categorize the type of pavement distress detected, and to store the geo-reference for the detected pavement distress in real time as the survey data is stored.

Throughout the description and claims to this specification the word "comprise" and variation of that word such as "comprises" and "comprising" are not intended to exclude other additives, components, integrations or steps. While various illustrative embodiments have been described, it will be appreciated that these embodiments are provided as illustrative examples, and are not meant to limit the scope of the invention, as defined by the following claims.

The invention claimed is:

1. A mobile pavement surface scanning system for detecting pavement distress, comprising:
   one or more light sources mounted to a mobile vehicle for illuminating a pavement surface;
   one or more stereoscopic image capturing devices mounted to the mobile vehicle for capturing sequential images of the illuminated pavement surface;
   a plurality of positioning sensors mounted to the mobile vehicle, the positioning sensors adapted to encode movement of the mobile vehicle and provide a synchronization signal for the sequential images captured by the one or more stereoscopic image capture devices; and
   one or more computer processors configured to:
      synchronize the sequential images captured by each camera of the one or more stereoscopic image capturing devices;
      generate intensity image pairs from the synchronized sequential images;
      perform a 3D reconstruction of the illuminated pavement surface from the intensity image pairs using stereoscopic principles;
      generate a depth image and an intensity image pair from the 3D reconstruction; and
      process at least one of the depth image and the intensity image utilizing one or more distress detection modules to detect a type of pavement distress.

2. The system of claim 1, wherein the one or more distress detection modules comprise a computer vision module for detecting pavement distress utilizing at least one of the depth image and an intensity image pair.

3. The system of claim 2, wherein the one or more distress detection modules further comprise a machine learning module, and the computer vision module is adapted to generate a learning feed forward to the machine learning module.

4. The system of claim 1, wherein the one or more distress detection modules comprise a machine learning module for detecting pavement distress utilizing at least one of the depth image and an intensity image pair.

5. The system of claim 4, wherein the machine learning module includes a learning feedback loop to enable the machine learning module to improve detection of pavement distresses.

6. The system of claim 5, wherein the machine learning module comprises an artificial intelligence (AI) engine executing a learning algorithm to detect and classify distresses based on its iterative training.

7. The system of claim 6, wherein the machine learning module is adapted to provide a feedback signal to dynamically change a parameter of a component on the mobile vehicle for capturing the sequential images on the illuminated pavement surface.

8. The system of claim 7, wherein the feedback signal is processed to change a parameter of the one or more light sources mounted to the mobile vehicle.

9. The system of claim 7, wherein the feedback signal is processed to change a parameter of the one or more stereoscopic image capturing devices.

10. The system of claim 6, wherein the machine learning module is adapted to select a type of image processing filter in dependence upon the type of pavement distress being detected.

11. The system of claim 10, wherein the machine learning module is adapted to categorize the type of pavement distress detected, and to store the geo-reference for the detected pavement distress in real time as the survey data is stored.

12. A method of scanning a pavement surface for detecting pavement distress, comprising:
providing one or more light sources mounted to a mobile vehicle for illuminating a pavement surface;
providing one or more stereoscopic image capturing devices mounted to the mobile vehicle for capturing sequential images of the illuminated pavement surface;
providing a plurality of positioning sensors mounted to the mobile vehicle, the positioning sensors adapted to encode movement of the mobile vehicle and provide a synchronization signal for the sequential images captured by the one or more stereoscopic image capture devices; and
providing one or more computer processors configured to:
synchronize the sequential images captured by each camera of the one or more stereoscopic image capturing devices;
generate intensity image pairs from the synchronized sequential images;
perform a 3D reconstruction of the illuminated pavement surface from the intensity image pairs using stereoscopic principles;
generate a depth image and an intensity image pair from the 3D reconstruction; and
process at least one of the depth image and the intensity image utilizing one or more distress detection modules to detect a type of pavement distress.

13. The method of claim 12, wherein the one or more distress detection modules comprise a computer vision module for detecting pavement distress utilizing at least one of the depth image and an intensity image pair.

14. The method of claim 13, wherein the one or more distress detection modules further comprise a machine learning module, and the computer vision module is adapted to generate a learning feed forward to the machine learning module.

15. The method of claim 12, wherein the one or more distress detection modules comprise a machine learning module for detecting pavement distress utilizing at least one of the depth image and an intensity image pair.

16. The method of claim 15, wherein the machine learning module includes a learning feedback loop to enable the machine learning module to improve detection of pavement distresses.

17. The method of claim 16, wherein the machine learning module comprises an artificial intelligence (AI) engine executing a learning algorithm to detect and classify distresses based on its iterative training.

18. The method of claim 17, wherein the machine learning module is adapted to provide a feedback signal to dynamically change a parameter of a component on the mobile vehicle for capturing the sequential images on the illuminated pavement surface.

19. The method of claim 18, wherein the feedback signal is processed to change a parameter of the one or more light sources mounted to the mobile vehicle.

20. The method of claim 18, wherein the feedback signal is processed to change a parameter of the one or more stereoscopic image capturing devices.

21. The method of claim 17, wherein the machine learning module is adapted to select a type of image processing filter in dependence upon the type of pavement distress being detected.

22. The method of claim 21, wherein the machine learning module is adapted to categorize the type of pavement distress detected, and to store the geo-reference for the detected pavement distress in real time as the survey data is stored.

* * * * *